(12) United States Patent
Yen

(10) Patent No.: US 7,808,562 B2
(45) Date of Patent: Oct. 5, 2010

(54) METHOD AND DEVICE FOR RECEIVING DIGITAL BROADCASTS

(75) Inventor: Wen-Yi Yen, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 1230 days.

(21) Appl. No.: 11/389,376

(22) Filed: Mar. 24, 2006

(65) Prior Publication Data

US 2007/0067813 A1  Mar. 22, 2007

(30) Foreign Application Priority Data

Sep. 22, 2005  (TW) .............................. 94132876 A

(51) Int. Cl.
*H04N 5/50* (2006.01)

(52) U.S. Cl. ...................................... 348/732; 348/570

(58) Field of Classification Search ................ 348/731, 348/732, 570, 725, 180, 192; 725/38; 455/150.1, 455/154.1, 158.1, 158.2, 158.4, 161.1, 161.3, 455/166.1, 168.1, 179.1, 184.1, 185.1, 186.1
See application file for complete search history.

(56) References Cited

U.S. PATENT DOCUMENTS

| 5,623,422 | A | * | 4/1997 | Williams ..................... 709/240 |
| 5,758,271 | A | * | 5/1998 | Rich et al. ................. 455/234.1 |
| 6,229,480 | B1 | * | 5/2001 | Shintani ...................... 342/359 |
| 6,389,070 | B1 | * | 5/2002 | Cugnini et al. .............. 375/232 |
| 6,400,937 | B1 | * | 6/2002 | Charas et al. ................ 455/403 |
| 6,483,553 | B1 | * | 11/2002 | Jung .......................... 348/731 |
| 6,985,190 | B1 | * | 1/2006 | Klopfenstein et al. ....... 348/569 |
| 7,206,032 | B2 | * | 4/2007 | Shibusawa .................. 348/732 |
| 7,215,382 | B2 | * | 5/2007 | Bennett ...................... 348/570 |
| 7,663,704 | B2 | * | 2/2010 | Onomatsu et al. ........... 348/732 |
| 2002/0154623 | A1 | * | 10/2002 | Hundemer ................... 370/349 |
| 2004/0226044 | A1 | * | 11/2004 | Goode ......................... 725/95 |
| 2005/0086693 | A1 | | 4/2005 | Shintani |
| 2005/0213600 | A1 | * | 9/2005 | Tachiwa ...................... 370/437 |

FOREIGN PATENT DOCUMENTS

CN  1538741 A  10/2004

\* cited by examiner

*Primary Examiner*—Victor Kostak

(57) ABSTRACT

The invention provides a method for receiving digital broadcast signals of a plurality of channels. The method comprises: storing a channel-parameter contrast table which includes parameter values of a plurality of parameters with which each of the plurality of channels is previously received; testing whether the digital broadcast signals of one of the plurality of channels can be received according to the parameter values stored in the channel-parameter contrast table to determine a receiving status; generating a plurality of channel numbers corresponding to each of the receivable channels of the plurality of channels according to the receiving statuses of the plurality of channels; and receiving the signals of a target channel according to the parameter values stored in the channel-parameter contrast table, wherein the target channel is one of the plurality of channels and selected by a user through the plurality of channel numbers.

18 Claims, 5 Drawing Sheets

FIG. 2 channel - parameter contrast table 200 / 204

| channel name 202 | channel frequency (MHz) 210 | channel bandwidth (MHz) 212 | video packet identifier (Dec) 214 | audio packet identifier (Dec) 216 | other parameters 218 |
|---|---|---|---|---|---|
| CTS1 | 533 | 6 | 112 | 114 | |
| CTS2 | 539 | 6 | 112 | 114 | |
| CTS3 | 545 | 6 | 112 | 114 | |
| PTS | 551 | 6 | 112 | 114 | |
| DiMO TV | 557 | 6 | 112 | 114 | |
| Unknown | 564 | 6 | 112 | 114 | |
| FTV1 | 575 | 6 | 112 | 114 | |
| FTV2 | 581 | 6 | 112 | 114 | |
| FTV3 | 593 | 6 | 112 | 114 | |
| TTV1 | 599 | 6 | 112 | 114 | |
| TTV2 | 605 | 6 | 112 | 114 | |
| TTV3 | 605 | 6 | 112 | 114 | |
| CTV1 | 617 | 6 | 112 | 114 | |
| CTV2 | 623 | 6 | 112 | 114 | |
| CTV3 | 629 | 6 | 112 | 114 | |

250, 252, 254, 256, 258, 260, 262, 264, 266

| | channel - receiving status contrast table 300 | | |
|---|---|---|---|
| | channel name 302 | receiving status 304 | channel number 306 |
| 250 | CTS1 | O | 01 |
| 252 | CTS2 | O | 02 |
| 254 | CTS3 | O | 03 |
| | PTS | | |
| 256 | DiMO TV | O | 04 |
| 258 | Unknown | | |
| 260 | FTV1 | O | 05 |
| | FTV2 | O | 06 |
| | FTV3 | O | 07 |
| 262 | TTV1 | | |
| 264 | TTV2 | | |
| 266 | TTV3 | | |
| | CTV1 | O | 08 |
| | CTV2 | O | 09 |
| | CTV3 | O | 10 |

FIG. 3

| channel - receiving status contrast table 400 | | |
|---|---|---|
| channel name 402 | receiving status 404 | channel number 406 |
| CTS1 | ○ | 01 |
| CTS2 | ○ | 02 |
| CTS3 | ○ | 03 |
| PTS | ○ | 04 |
| Unknown | × | 05 |
| FTV1 | ○ | 06 |
| FTV2 | ○ | 07 |
| FTV3 | × | 08 |
| TTV1 | ○ | 09 |
| TTV2 | × | |
| TTV3 | ○ | |
| CTV1 | ○ | 10 |
| CTV2 | ○ | 11 |
| CTV3 | ○ | 12 |

FIG. 4

METHOD AND DEVICE FOR RECEIVING DIGITAL BROADCASTS

BACKGROUND OF THE INVENTION

1. Field of the Invention

The invention relates to digital broadcasts, and more particularly to receiving digital broadcasts.

2. Description of the Related Art

Digital television can provide better video quality and audio quality. It can also provide value-added services derived from digital television broadcasts. Because the value-added services bring great profits, enterprises in advanced countries are competing to develop business in this field, and the television broadcasts is gradually being transformed from traditional analog systems to digital systems. If television signals are broadcasted from traditional analog systems, the signal strength tends to be subject to the landforms in the transmission path, but the television signals broadcast from digital systems are not interfered with by the landforms in the transmission path. Additionally, bandwidth utilization of digital broadcasting is more efficient than that of analog broadcasting. Most importantly, digital broadcasts can provide a variety of value-added services derived from data broadcasting.

The digital broadcast signal-transmission mediums include cable, satellite, microwave, and terrestrial. The current digital terrestrial television broadcasting (DTTB) standard includes the Advanced Television System Committee (ATSC) standard of the United States, the Digital Video Broadcasting-Terrestrial (DVB-T) standard of Europe, and the Integrated Services Digital Broadcasting-Terrestrial (ISDB-T) standard of Japan. The DVB-T standard was accepted by European Telecommunication Standard Institute (ETSI) in February 1997 as the digital terrestrial television broadcasting standard of Europe (ETS 300 744). Australia, New Zealand, Singapore and Taiwan have also adopted the DVB-T standard for DTTB.

Current DVB-T players provide an auto scan function for automatically scanning and setting DVB-T broadcast channels. The scanning mode of the auto scan function includes "all channel scan" for scanning the whole frequency band for all channels in the region, "frequency range scan" for scanning a frequency range for channels, and "programmable user channel" for scanning a single channel set by a user. The mentioned scanning modes scan all channels sequentially through a range of frequency band. Scanning a single channel, however, requires one or two minutes (the bandwidth of a single channel is about 6 MHz), and the time required to scan the entire frequency band depends on the scan range of the frequency band and is about several to ten minutes. This increased time required causes large power consumption when the DVB-T receiver is installed in a notebook computer as the available power is limited. Additionally, if parameters for receiving a channel are not correct and cause errors, the parameters cannot be automatically adjusted, causing further inconveniences.

BRIEF SUMMARY OF THE INVENTION

Often, the channel frequencies do not always change, and channels seldom need to be scanned before receiving broadcasts. Thus, only reception status of the channels needs to be rechecked so as to shorten the time spent on scanning channels. If the parameters for receiving the channels are incorrect and the channels cannot be received, the parameters can be adjusted according to old workable parameter values stored in a parameter table to try to receive the channels again.

The invention provides a method for receiving digital broadcast signals of a plurality of channels. An embodiment of the method comprises: storing a channel-parameter contrast table which includes parameter values of a plurality of previously used parameters with which each of the plurality of channels is previously received; testing whether the digital broadcast signals of one of the plurality of channels can be received according to the parameter values stored in the channel-parameter contrast table to determine a receiving status which indicates whether the one of the plurality of channels is receivable or unreceivable; storing a channel-receiving status contrast table which includes the receiving statuses of the plurality of the channels; generating a plurality of channel numbers corresponding to each receivable channel according to the receiving statuses of the plurality of channels; and receiving the signals of a target channel according to the parameter values stored in the channel-parameter contrast table, wherein the target channel is one of the plurality of channels and selected by a user through the plurality of channel numbers.

The invention also provides a device for receiving digital broadcast signals of a plurality of channels. An embodiment of the device comprises: a receiver, receiving the digital broadcast signals; and a controller, coupled to the receiver, storing a channel-parameter contrast table which includes parameter values of a plurality of parameters for receiving each of the plurality of channels in former times, testing whether the digital broadcast signals of one of the plurality of channels can be received by the receiver according to the parameter values stored in the channel-parameter contrast table to determine a receiving status which indicates whether the one of the plurality of channels is receivable or unreceivable, storing a channel-receiving status contrast table which includes the receiving statuses of the plurality of the channels, generating a plurality of channel numbers corresponding to each receivable channel according to the receiving statuses of the plurality of channels, and receiving the signals of a target channel according to the parameter values stored in the channel-parameter contrast table; wherein the target channel is one of the plurality of channels and selected by a user through the plurality of channel numbers.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 2 shows a channel-parameter contrast table according to the invention;

FIG. 3 shows a channel-receiving status contrast table according to the invention; and FIG. 4 shows a channel-receiving status contrast table whose receiving status column and channel number column are updated after the automatic scan function is executed.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
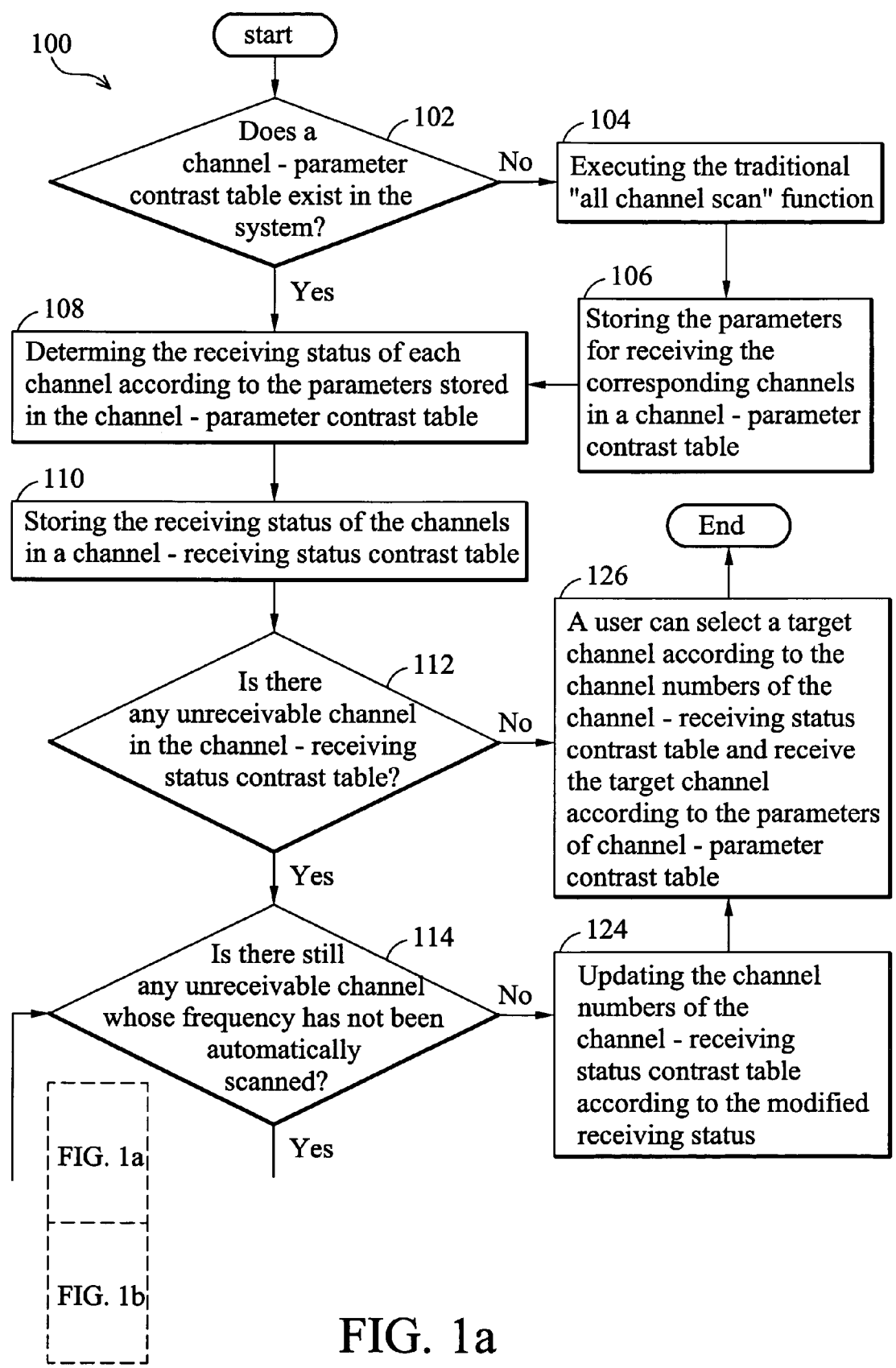
FIG. 1 is a flowchart of a method for receiving DTTB signals according to the invention.
Figure 1B:
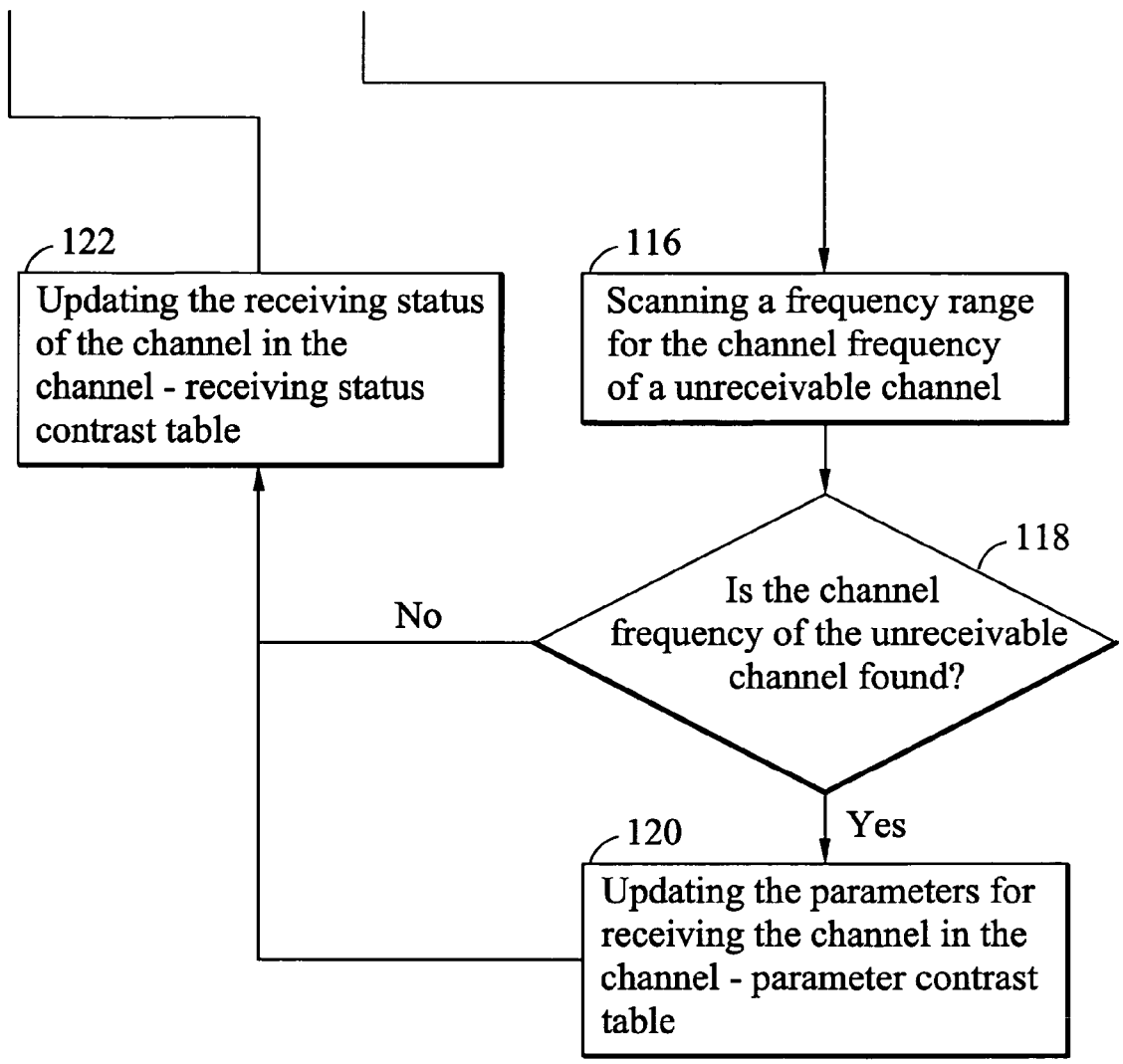

FIG. 1 is a flowchart of a method 100 for receiving DTTB signals according to the invention. The method 100 can be implemented by a controller of a device which receives the DTTB signal. The device can receives signals of DTTB channels by implementing the method 100 and may be a DVB-T player, a DVB-T PCI card, a digital television (DTV), a mobile DTV receiver, a DVB-T set top box which transforms digital video signals to analog video signals, and a digital video recorder (DVR) or a personal video recorder (PVR) in which a DTV tuner is installed. The device may also be a DTV tuner installed on a motherboard of a personal computer, such as a personal computer installed with the Media Center operating system. Although the method 100 is illustrated here with the reception of DTTB or DVB-T signals, the method 100 can be implemented by a mobile phone conforming with the digital video broadcasting-handheld (DVB-H) standard to receive signals of DVB-H channels. Furthermore, the method 100 can also be used to receive signals of digital audio broadcasting (DAB) channels.

A selection item may be added to the user interface of the DVB-T player or other similar devices so as to be chosen for executing the function of the method 100. The selection item may be referred to as "smart scan". Before the smart scan function is executed, whether the frequency of DTTB channels is scanned for the first time must be first determined in step 102. If the frequency of DTTB channels is scanned for the first time, a channel-parameter contrast table is not currently stored in the system. Thus, the traditional "all channel scan" function can be executed in step 104 to scan frequencies of all channels in the region. The parameters obtained in the scanning of step 104 can then be stored in a channel-parameter contrast table in step 106. The channel-parameter contrast table records the channels found in the scanning step 104 and the corresponding parameters for receiving the channels. Otherwise, if the frequency of DTTB channels is not scanned for the first time, the system has stored the channel-parameter contrast table which includes parameters for receiving the corresponding channels, and the smart scan function can be directly executed in step 108 according to the parameters stored in the channel-parameter contrast table.

FIG. 2 shows a channel-parameter contrast table 200 according to the invention. The table 200 includes two columns: channel name 202 and the parameters 204 for receiving the corresponding channels. Each row of the table 200 corresponds to a channel found in the scanning step 104. The parameters 204 may include a channel frequency parameter 210, a channel bandwidth parameter 212, a video packet identifier (video PID) parameter 214, an audio packet identifier (audio-PID) parameter 216, and other parameters 218. For example, row 250 represents a first channel of Chinese Television System (CTS1), and the parameters corresponding to the channel CTS1 include a channel frequency of 533 MHz, a frequency bandwidth of 6 MHz, a video PID of 112 Dec (decimal format), an audio PID of 114 Dec (decimal format), and other parameters.

Because the channel-parameter contrast table 200 is present, the smart scan function can be executed. The channels 202 stored in each row of the table 200 is tested in step 108 for channel receiving one by one according to the corresponding parameters 204 stored in the table 200. The receiving status of each channel tested in step 108 is recorded sequentially in a channel-receiving status contrast table in step 110. FIG. 3 shows a channel-receiving status contrast table 300 according to the invention. The table 300 includes three columns: channel name 302, receiving status 304, and channel number 306. The channels stored in the channel name 302 column of table 300 are respectively correspondingly identical to those stored in the channel name 202 column of table 200. For example, both the row 250 of table 200 and the row 250 of table 300 represent the CTS1 channel.

In step 110, the receiving status of each channel obtained in step 108 is recorded in the receiving status column 304 of table 300 according to the parameters of the tested channels. For example, if the signal of CTS1 of row 250 is received successfully, the receiving status 304 of CTS1 is recorded as "O". Otherwise, if the signals of CTS1 of row 250 cannot be received according to the parameters 204 of table 200, nothing is recorded in the receiving status column 304 of CTS1. After all channels of column 302 are tested, the receiving status column 304 of table 300 is completely recorded. The channel number 306 of each receivable channel which is recorded as "O" is generated in step 110 according to the order of the channels appearing in column 210 of the table 200. For example, the receiving status 304 corresponding to the CTS1 channel of row 250 is recorded as "O", and the channel frequency 210 of CTS1 in table 200 is 533 MHz, which is the channel with the smallest channel frequency among all channels in the region. Thus, CTS1 channel of row 250 is assigned the channel number 306 of "01". The second channel of Chinese Television System (CTS2) next to the CTS1 channel is then assigned the channel number 306 of "02", because its channel frequency 210 is 539 MHz which is the second smallest channel frequency among all channel frequencies. The CTS3 channel of row 252 is then assigned the channel number 306 of "03". The Taiwan Public Television Service (PTS) channel of row 254 is not assigned a channel number 306, because its receiving status 304 is not a "O". The DIMO TV channel of row 256 is then assigned the channel number 306 of "04". The rest may be deduced by analogy. Thus, the channel number column 306 of table 300 is completed and can be taken as a reference for a user to select channels of the region.

Whether the receiving status column 304 includes an unreceivable channel is then determined in step 112. For examples, the PTS channel of row 254, the unknown channel of row 258, and the first, second and third channels of Taiwan Television Company (TTV1, TTV2, and TTV3 channels) of row 262, 264, and 266 are unreceivable channels because the respective receiving status 304 of those channels is not recorded as a "O". If there are no unreceivable channels in receiving status column 304, a target channel can be selected through the channel numbers 306 of table 300 for directly receiving the target channel according to the corresponding parameters 204 of table 200. Otherwise, if there is at least one unreceivable channel, whether all of the unreceivable channels have been automatically scanned is determined in step 114 for updating the parameters in the following steps. If there is still an unreceivable channel, the frequency of which has not been automatically scanned, the frequency of the unreceivable channel is automatically scanned in step 116. The method for scanning an unreceivable channel of table 300 is to search a frequency range from the channel frequency of the last channel to the channel frequency of the next channel for the channel frequency of the unreceivable channel. For example, the PTS channel of row 254 is situated between the CTS3 channel of row 252 and the DIMO TV channel of row 256, and the channel frequencies of the CTS3 and DimoTV channel are respectively 545 and 557 MHz. Thus, the scan range of the PTS channel is from 545 to 557 MHz. For another example, the unknown channel of row 258 is situated between the Dimo TV channel of row 256 and the first channel of Formosa Television Company (FTV1) of row 260, and the channel frequencies of the Dimo TV and FTV1 channel are respectively 557 and 575 MHz. Thus, the scan range of the unknown channel is from 557 to 575 MHz.

Step 118 determines whether the channel frequency of the unreceivable channel is found. If not, the receiving status 304 of the unreceivable channel is recorded as a "X" in step 122. FIG. 4 shows a channel-receiving status contrast table 400 whose receiving status column 404 and channel number column 406 is updated from the table 300 after the automatic scan function is executed. The original receiving statuses 304 of the unknown, TTV1, and TTV3 channels are empty in table 300, and the channel frequencies of those channels still cannot be found in the scanning step 116. Thus the receiving statuses 404 of those channels are recorded as a "X" Otherwise, if the channel frequency of the unreceivable channel can be found, the parameters 204 for receiving the channel is updated in step 120, and the channel becomes a receivable channel. For example, the original channel frequency of the PTS channel of row 254 is 551 MHz in the table 200, and the new channel frequency for receiving the PTS channel is 551.5 MHz. Thus, the channel frequency parameter 210 of the PTS channel is updated with 551.5 MHz. the receiving status 404 of the PTS channel is then updated with a "○" in step 122 to indicate it's a receivable channel. For example, the original receiving statuses 304 of the PTS and TTV2 channels are empty in table 300, but the channel frequencies of those channels are found in the scanning step 116. Thus the receiving statuses 404 of those channels are recorded as a "○"

Step 114 determines whether any unreceivable channel whose frequency has not been automatically scanned. If there is no unreceivable channel the channel frequency of which has not been scanned in step 114, there is no empty in the receiving status column 404 of table 400, and the auto scan function has been executed completely. The channel number 406 of table 400 is then updated in step 124 according to the updated receiving status 404. The new channel number 406 is generated by sorting all of the receivable channels whose receiving status 404 is a "○" according to its channel frequency and assigning each receivable channel a new channel number. The unreceivable channel whose receiving status 404 is a "X" is not assigned any channel number. For examples, the original channel number 306 of the PTS channel is empty, but the new channel number 406 of the PTS channel is "04". The original channel number 306 of the Dimo TV channel of row 255 is "04", but the new channel number 406 of the Dimo TV channel is "05" because the PTS channel is now receivable. Finally, the user can select a target channel according to the new channel numbers 406 of table 400 and receive the signals of the target channel according to the parameters 204 of the table 200 in step 126.

The invention records the recent parameters for receiving the channels. Every time a user attempts to receive the DTTB signals, the receiving status of the channels are determined according to the stored parameters, and only the unreceivable channels need to be automatically scanned, Thus, the invention can reduce the scan time of channels to facilitate the DTTB reception.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for receiving digital broadcast signals of a plurality of channels, comprising:
    storing a channel-parameter contrast table which includes parameter values of a plurality of parameters with which each of the plurality of channels is previously received;
    testing whether the digital broadcast signals of one of the plurality of channels are received according to the parameter values stored in the channel-parameter contrast table to determine a receiving status, which indicates whether the one of the plurality of channels is receivable or unreceivable;
    storing a channel-receiving status contrast table which includes the receiving statuses of the plurality of the channels;
    receiving the signals of a target channel according to the parameter values stored in the channel-parameter contrast table, wherein the target channel is one of the plurality of channels selected by a user according to the receiving statuses;
    determining at least one unreceivable channel from the plurality of channels according to the receiving statuses stored in the channel-receiving status contrast table;
    scanning a frequency range for the channel frequency of the at least one unreceivable channel, wherein the frequency range starts from the channel frequency of a last channel of the unreceivable channel to the channel frequency of a next channel of the unreceivable channel; and
    updating the channel-parameter contrast table and the channel-receiving status contrast table according to a result of the scanning step,
    wherein the channel-parameter contrast table is stored in a storage medium.

2. The method as claimed in claim 1, wherein the plurality of parameters are selected from the groups of channel frequency, channel bandwidth, video packet identifier, audio packet identifier, or the combination thereof.

3. The method as claimed in claim 1, wherein the method further comprises a step of generating a plurality of channel numbers corresponding to each of the receivable channels of the plurality of channels according to the receiving statuses of the plurality of channels and through the plurality of channel numbers, the target channel is selected by the user.

4. The method as claimed in claim 3, wherein the channel-receiving status contrast table stores the plurality of channel numbers, and the plurality of channel numbers is generated according to the sequence of a channel frequency of the receivable channels of the plurality of channels.

5. The method as claimed in claim 1, wherein the updating step further comprising:
    updating the parameter values of the unreceivable channels stored in the channel-parameter contrast table if the channel frequency of the unreceivable channel is found in the scanning step;
    updating the receiving statuses of the unreceivable channels stored in the channel-receiving status contrast table if the channel frequency of the unreceivable channel is found in the scanning step; and
    regenerating the plurality of channel numbers according to the updated receiving statuses of the plurality of channels.

6. The method as claimed in claim 1, wherein storing of the channel-parameter contrast table comprises: executing an all channel scan function to receive the plurality of channels to obtain the parameter values of the plurality of parameters in the channel-parameter contrast table.

7. The method as claimed in claim 1, wherein the digital broadcast signals are selected from the group of the digital terrestrial television broadcasting (DTTB) signals, the digital video broadcasting-handheld (DVB-H) signals, or the digital audio broadcasting (DAB) signals.

8. The method as claimed in claim 7, wherein the DTTB signals complies with one of the following standards: the Advanced Television System Committee (ATSC) standard of the United States, the Digital Video Broadcasting-Terrestrial (DVB-T) standard of Europe, and the Integrated Services Digital Broadcasting-Terrestrial (ISDB-T) standard of Japan.

9. The method as claimed in claim 1, wherein the method is implemented by a controller of a device which receives the DTTB signal, and the device is selected from the group of a DVB-T player, a DVB-T PCI card, a digital television (DTV), a DVB-T set top box, and a digital video recorder (DVR) or a personal video recorder (PVR) having a DTV tuner installed therein.

10. A device for receiving digital broadcast signals of a plurality of channels, comprising:

a receiver, receiving the digital broadcast signals;

a storage medium, storing a channel-parameter contrast table which includes parameter values of a plurality of parameters with which each of the plurality of channels is previously received; and a controller, coupled to the receiver, testing whether the digital broadcast signals of one of the plurality of channels are received by the receiver according to the parameter values stored in the channel-parameter contrast table to determine a receiving status which indicates whether the one of the plurality of channels is receivable or unreceivable, storing a channel-receiving status contrast table which includes the receiving statuses of the plurality of the channels, receiving the signals of a target channel according to the parameter values stored in the channel-parameter contrast table, determines at least one unreceivable channel from the plurality of channels according to the receiving statuses stored in the channel-receiving status contrast table, scans a frequency range for the channel frequency of the at least one unreceivable channel, and updates the channel-parameter contrast table and the channel-receiving status contrast table according to a result of the scanning step;

wherein the frequency range starts from the channel frequency of a last channel of the unreceivable channel to the channel frequency of a next channel of the unreceivable channel;

wherein the target channel is one of the plurality of channels and selected by a user according to the receiving statuses thereof.

11. The device as claimed in claim 10, wherein the device is selected from the group of a DVB-T player, a DVB-T PCI card, a digital television (DTV), a DVB-T set top box, and a digital video recorder (DVR) or a personal video recorder (PVR) having a DTV tuner installed therein.

12. The device as claimed in claim 10, wherein the controller generates a plurality of channel numbers corresponding to each of the receivable channels of the plurality of channels according to the receiving statuses of the plurality of channels and through the plurality of channel numbers, the target channel is selected by the user.

13. The device as claimed in claim 10, wherein the plurality of parameters are selected from the group of channel frequency, channel bandwidth, video packet identifier, audio packet identifier, or the combination thereof.

14. The device as claimed in claim 10, wherein the channel-receiving status contrast table stores the plurality of channel numbers, and the plurality of channel numbers is generated according to the sequence of a channel frequency of the receivable channels of the plurality of channels.

15. The device as claimed in claim 10, wherein the controller updates the parameter values of the unreceivable channel stored in the channel-parameter contrast table if the channel frequency of the unreceivable channel is found, updates the receiving status of the unreceivable channel stored in the channel-receiving status contrast table if the channel frequency of the unreceivable channel is found, and regenerates the plurality of channel numbers according to the updated receiving statuses of the plurality of channels.

16. The device as claimed in claim 10, wherein the controller executes an all channel scan function for receiving the plurality of channels to generate the parameter values of the plurality of parameters in the channel-parameter contrast table.

17. The device as claimed in claim 10, wherein the digital broadcast signals are selected from the group of the digital terrestrial television broadcasting (DTTB) signals, the digital video broadcasting-handheld (DVB-H) signals, or the digital audio broadcasting (DAB) signals.

18. The device as claimed in claim 17, wherein the DTTB signals complies with one of the following standards: the Advanced Television System Committee (ATSC) standard of the United States, the Digital Video Broadcasting-Terrestrial (DVB-T) standard of Europe, and the Integrated Services Digital Broadcasting-Terrestrial (ISDB-T) standard of Japan.

* * * * *